Patented Mar. 23, 1948

2,438,379

UNITED STATES PATENT OFFICE 2,438,379

PRODUCTION OF CATALYSTS

Raymond C. Archibald, Berkeley, and Bernard S. Greensfelder and Frank T. Eggertsen, Oakland, Calif., assignors to Shell Development Company, San Francisco, Calif., a corporation of Delaware No Drawing. Application February 20, 1946, Serial No. 649,122

7 Claims. (Cl. 252—259)

This invention relates to the production of mineral inorganic oxide gel catalysts possessing a large available surface per unit weight.

For many catalytic reactions and conversions catalysts having extremely large available surfaces per unit weight are desired. Such catalysts are prepared either by preparing the catalyst in the form of a xerogel or aerogel or by applying the catalytic agent or promoter to a support or base having a gel structure. These gel catalysts when properly prepared have a microporous structure which affords an available surface of at least 100 m.$^2$/gm. and often in the neighborhood of 200-600 m.$^2$/gm. Various oxides such as those of Be, Mg, Zn, Al, Si, Zr, Sn, Th, V, Cr, Mo, W, U, Mn, Fe, Co and Ni as well as numerous combinations of these oxides with each other and with other oxides have been prepared in a microporous gel state for use in catalysis.

The most common method of preparing such catalysts is to produce the hydrous oxide in substantially an amorphous or sol state by any one of the variety of well known methods applicable with the particular composition and then to carefully dehydrate the product. Such a product is called a xerogel.

In few cases these products are prepared as aerogels. In preparing the aerogel the liquid in the pores of the material is removed while holding the material under pressure and at a temperature above the critical temperature of the liquid. In some cases this is considered an advantage since it prevents or decreases rupture of the cell walls by capillary forces and results in a somewhat larger available surface. In most cases, however, no appreciable improvement is obtained by this more expensive and troublesome method and it is very seldom used. In still other cases the aerogel is quite inferior to the xerogel.

According to the process of the present invention inorganic oxide gels are prepared in a state more suitable for catalysis by a practical and advantageous treatment which involves displacing the water with alcohol or similar non-aqueous liquid, heating under pressure, and suddenly releasing the pressure.

The process is particularly suited and advantageous for the production of gel catalysts consisting substantially of the oxides of Si, Al, Zr, and Mg, alone and in various combinations. Thus, it is particularly suited for the production of the various so-called synthetic cracking catalysts comprising substantial amounts of two or more of these oxides. The process is however also applicable for the production of other metal oxide gel catalysts such as mentioned above. In making these catalysts the hydrous gels may be prepared by any of the numerous known methods.

The hydrous gels are predominantly water and in most cases the water content is in the order of 80–95%. Prior to drying the gel most of this water is replaced by an alcohol or other suitable non-aqueous liquid. It is not essential that all of the water be removed. In fact, there is a small amount of relatively firmly bound water which is exceedingly difficult to remove. However, the displacement is preferably reasonably complete. The displacement of the water may be most effectively carried out by continuously washing the gel with a slow stream of the displacing liquid, for instance by continuously slurrying and filtering or by passing the displacing liquid in a slow stream through a tower or tray filled with lumps of the hydrous gel. Suitable liquids to displace the water are organic liquids which are at least partially miscible with water and have normal boiling points below about 200° C. Methanol, ethanol, the propanols, the butanols, the lower boiling aliphatic ketones and the lower boiling aliphatic amines, for example, are suitable. Isopropyl alcohol is a preferred agent because of its superior vaporization characteristics.

When the water has been substantially displaced by the alcohol or other agent, the gel is heated under pressure and then "exploded" by sudden release of the pressure.

The temperature prior to release of the pressure is appreciably above the normal boiling point of the liquid and is preferably sufficiently high that the liquid is substantially completely evaporated without further heating of the exploded gel. However, the temperature should not be as high as the critical temperature of the liquid present. If the temperature is above the critical temperature of the liquid the only expansion effect possible is the expansion of the small amount of gas in the pores due to the decrease of the pressure, whereas at temperatures below the critical temperature the small amount of liquid in the pores is expanded to a relatively large volume of gas giving the desired exploding effect.

The pressure prior to exploding is at least the vapor pressure of the liquid component at the prevailing temperature and may be increased beyond this, if desired, to increase the explosive effect by pumping in a gas such as air, nitrogen, carbon dioxide or the like. The pressure should be at least 100 p. s. i. and is preferably considerably higher.

The exploding of the gel may be effected batchwise, for instance by suddenly releasing the pressure on an autoclaved batch of the gel, or it may be carried out continuously, for instance by injecting under pressure the gel suspended in a stream of the liquid into a low pressure chamber at such a rate as to obtain an equivalent exploding effect. The material used to displace the water may be recovered and reused.

After the gel has been exploded it may be further calcined to increase the strength, and/or impregnated with one or more promoting agents desired in the catalyst.

The catalysts prepared as described are somewhat different from the hitherto-used xerogels and aerogels due to the exploding treatment. The exploding treatment causes a general expansion of the pores. Gels having large pores are found to be much superior to the usual fine-pored xerogels and aerogels for certain purposes. This is particularly the case with the synthetic siliceous gel catalysts used in catalytic cracking. Also, it is found that in some catalytic reactions the rate of diffusion of the reactant and reaction products through the catalyst particle is a controlling factor. The exploding treatment also causes rupture of certain of the cell walls and thus leads to a more open structure which favors fast diffusion. The exploding treatment in many cases also affords a product of somewhat larger available surface per unit weight. However, the increase in the available surface is generally only a fraction of the total available surface and is not of great importance.

The gels can easily be exploded without first displacing the water with alcohol or one of the other liquids mentioned. However, it should be particularly pointed out that this leads to exploded gels which are much inferior to the hitherto-used xerogels and aerogels. This is believed to be due to contact of the gel with steam. Thus, in general, it is advisable to avoid all unnecessary heating of the gel in the presence of substantial amounts of steam or water.

*Example*

A silica-alumina hydrogel containing about 8.85% silica, 1.25% alumina and 90% water and prepared by one of the accepted methods was used to prepare a catalyst. The silica-alumina hydrogel was the same as that used in preparing a commercial cracking catalyst and when dried at atmospheric pressure gave a fine-pored xerogel catalyst having an available surface of about 500 m.$^2$/g. This hydrous gel was treated with isopropyl alcohol to produce the corresponding alcogel. The alcogel was then placed in an autoclave provided with a bursting disc assembly adjusted to explode the material at 375 p. s.i. and at a temperature of 197° C. Upon heating the autoclave the gel was exploded at these conditions. The exploded product was an open-structured gel catalyst having an available surface of 517 m.$^2$/g.

Similar experiments were carried out by exploding the same gel but without first displacing the water with alcohol. The conditions of the explosions and the available surface areas of the exploded gels are given in the following table:

| Gel | Pressure, p. s. i. | Temp., °C. | Surface, m.$^2$/gm. |
|---|---|---|---|
| Alcogel | 375 | 197 | 517 |
| Do | 400 | 200 | 520 |
| Hydrogel | 160 | 267 | 350 |
| Do | 625 | 280 | 228 |
| Do | 1,000 | 354 | 174 |

The invention claimed is:

1. Process for the production of gel type catalysts which comprises displacing water in a hydrous inorganic oxide gel with a non-aqueous organic liquid at least partially miscible with water and having a boiling point below about 200° C., heating the gel with said liquid under a pressure of at least 100 p. s. i. to a temperature between the normal boiling point and the critical temperature of said liquid and then exploding the gel by sudden release of the pressure.

2. Process for the production of siliceous gel type catalysts which comprises displacing water in a hydrous siliceous oxide gel with a non-aqueous organic liquid at least partially miscible with water and having a boiling point below about 200° C., heating the gel with said liquid under a pressure of at least 100 p. s. i. to a temperature between the normal boiling point and the critical temperature of said liquid and then exploding the gel by sudden release of the pressure.

3. Process for the production of silica-alumina gel catalysts which comprises displacing water in a silica-alumina hydrogel with a non-aqueous organic liquid at least partially miscible with water and having a boiling point below about 200° C., heating the gel with said liquid under a pressure of at least 100 p. s. i. to a temperature between the normal boiling point and the critical temperature of said liquid and then exploding the gel by sudden release of the pressure.

4. Process for the production of gel type catalysts which comprises displacing water in a hydrous metal oxide gel with an alcohol having a boiling point below about 200° C., heating the gel with said alcohol under a pressure of at least 100 p. s. i. at a temperature between the normal boiling point and the critical temperature of said alcohol and then exploding the gel by sudden release of the pressure.

5. Process for the production of gel type catalysts which comprises displacing water in a hydrous metal oxide gel with isopropyl alcohol, heating the gel with isopropyl alcohol under a pressure of at least 100 p. s. i. to a temperature between the normal boiling point and the critical temperature of isopropyl alcohol and then exploding the gel by sudden release of the pressure.

6. Process for the production of gel type catalysts which comprises displacing water in a hydrous metal oxide gel with isopropyl alcohol, heating the gel with the isopropyl alcohol under a pressure of about 400 p. s. i. to a temperature of about 200° C. and then exploding the gel by sudden release of the pressure.

7. Process for the production of silica-alumina gel catalysts which comprises displacing water in a silica-alumina hydrogel with isopropyl alcohol, heating the gel with the isopropyl alcohol under a pressure of about 400 p. s. i. to a temperature of about 200° C. and then exploding the gel by sudden release of the pressure.

RAYMOND C. ARCHIBALD.
BERNARD S. GREENSFELDER.
FRANK T. EGGERTSEN.

REFERENCES CITED

The following references are of record in the file of this patent:

UNITED STATES PATENTS

| Number | Name | Date |
|---|---|---|
| 1,935,176 | Connolly | Nov. 14, 1933 |
| 2,093,454 | Kistler | Sept. 21, 1937 |
| 2,161,186 | Morgan et al. | June 6, 1939 |
| 2,181,372 | Kellogg | Nov. 28, 1939 |
| 2,395,291 | Patterson | Feb. 19, 1946 |